UNITED STATES PATENT OFFICE.

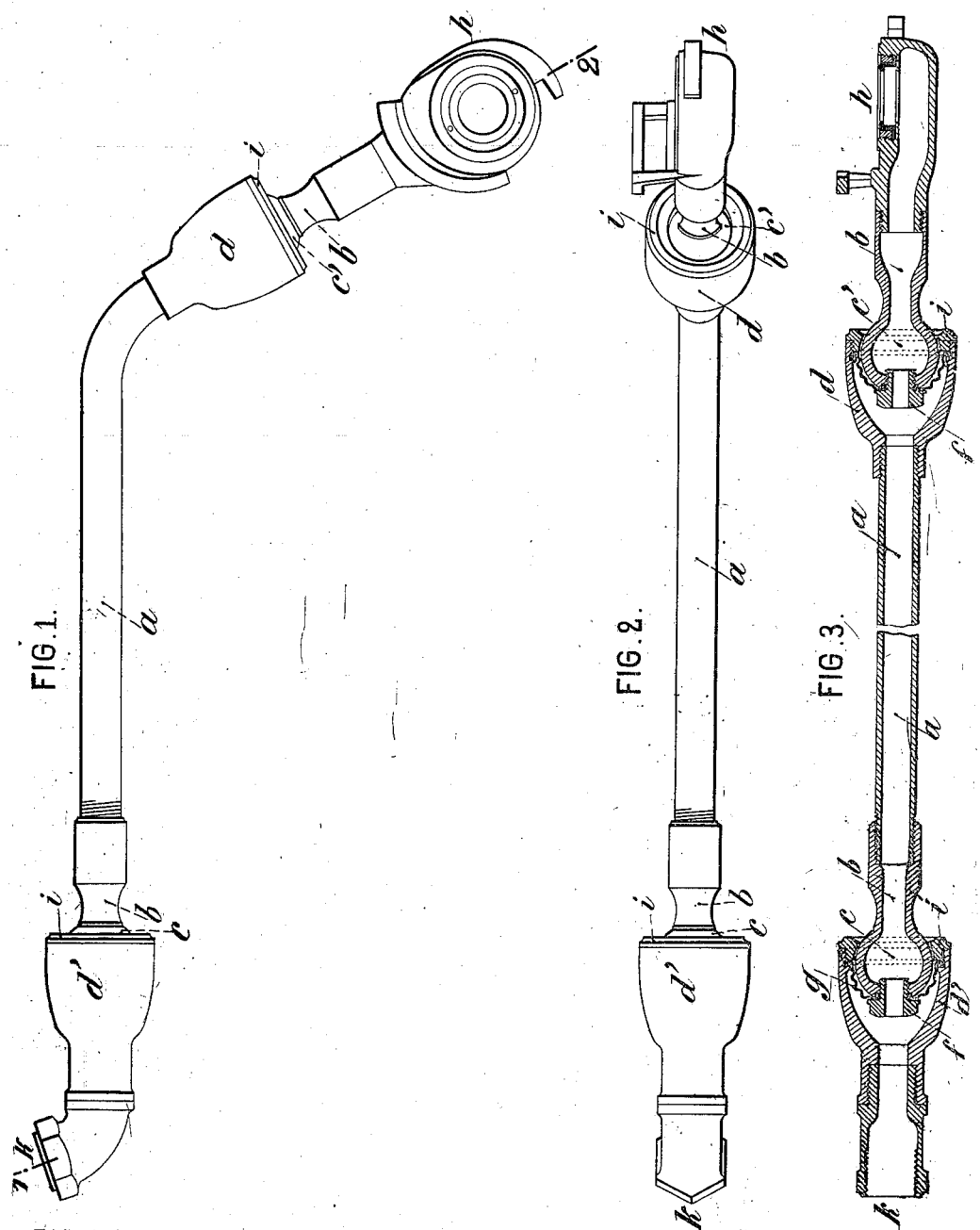

LUCIEN LERÈDE, OF PARIS, FRANCE.

PIPE-COUPLING.

SPECIFICATION forming part of Letters Patent No. 330,134, dated November 10, 1885.

Application filed July 9, 1885. Serial No. 170,960. (No model.)

*To all whom it may concern:*

Be it known that I, L. LERÈDE, of the city of Paris, France, engineer, have invented new and useful Improvements in and relating to Coupling or Connecting Tubes, chiefly designed for railway-brake apparatus, of which the following is a full, clear, and exact description.

This invention relates to jointed tubes, chiefly designed for compressed-air and vacuum brake apparatus, and has for its object to remedy the inconveniences resulting from the employment of flexible tubes of india-rubber or the like for establishing a connection between the air-pipes of adjacent carriages of a train, which flexible tubes crack or split, thereby ceasing to operate properly.

To this end the said invention consists, essentially, in the employment, in lieu of flexible tubes, as described, of metal tubes, each of which has at each of its extremities a ball-and-socket or other universal joint, provided with means for rendering it perfectly tight, thereby enabling the tube to yield as desired.

In order to enable the said invention to be understood, I have illustrated it, by way of example, in the accompanying drawings, in which—

Figure 1 is an elevation of a connecting-pipe arranged according to this invention. Fig. 2 is a side view of the same; and Fig. 3 represents a section on the line 1 2, Fig. 1.

In these figures similar letters of reference indicate the same parts.

$a$ indicates a metal tube which is screw-threaded at its two extremities, one of which carries a hollow sphere or ball, $c$, provided with a shank, $b$, and the other a socket, $d$, for receiving a ball, $c'$, which forms with it a joint at this extremity. The hollow sphere or ball $c$ fits into a socket, $d'$, which resembles the socket $d$, and is attached to the fixed air-pipe $k$ of the carriage, while the socket $d$ receives the ball $c'$, attached to the half-coupling $h$. It is evident that this arrangement of the balls and sockets is not essential and can be reversed—that is to say, the tube $a$ can be provided with a ball at each end or with a socket at each end, the fixed pipe and the half-coupling being then provided with corresponding sockets or balls.

The spheres or balls $c$ $c'$ are provided with screws $f$, having passages through them longitudinally. Each of these screws holds between it and the sphere one edge of a covering or membrane, $g$, of caoutchouc or any other suitable elastic material. This membrane $g$ extends over about half the sphere or ball and enables perfectly-tight joints to be obtained between the tube $a$ and the part to be connected. The membrane is corrugated in order to allow for stretching without undue strain when the ball and socket are moved to extreme adjustments.

In order to retain the spheres or balls $c$ in their sockets, the latter are tapped at their extremities to receive the screw-collars $i$, which also serve to hold the outer edges of the membranes $g$. Each of the collars $i$ is provided with an orifice of sufficiently large size to permit the shank $b$ of the ball to move freely to compensate for the undulations or movements of the vehicles.

This arrangement of jointed tubes can also be applied to other pipes besides those for railway-brakes. The half-coupling $h$, of which the ordinary type is shown, as well as the tube $k$, may be of any suitable construction.

I claim—

1. The combination, with a hollow ball-and-socket connection, of a flexible membrane, connected at one edge to the interior of the socket, and connected at its opposite edge to the exterior of the ball within the socket, substantially as set forth.

2. The combination, with a hollow ball-and-socket connection, of a corrugated flexible membrane secured at its opposite ends to the ball and socket, respectively, substantially as set forth.

3. The combination, with the hollow socket $d$, having the collar $i$, and the hollow ball $c'$, having the tubular screw $f$, of the membrane $g$, connected with the ball and socket by the screw and ring, substantially as set forth.

The foregoing specification of my improvements in and relating to coupling or connecting tubes, chiefly designed for railway-brake apparatus, signed by me this 22d day of June, 1885.

LUCIEN LERÈDE.

Witnesses:
ROBT. M. HOOPER,
ALBERT MOREAU.